(12) United States Patent
Molinari (10) Patent No.: US 11,167,179 B2
(45) Date of Patent: Nov. 9, 2021

(54) SPORTS BALL AND METHOD OF MANUFACTURE

(71) Applicant: NIKE, Inc., Beaverton, OR (US)

(72) Inventor: Arthur Parker Molinari, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/694,125

(22) Filed: Nov. 25, 2019

(65) Prior Publication Data

US 2020/0171359 A1 Jun. 4, 2020

Related U.S. Application Data

(60) Provisional application No. 62/772,796, filed on Nov. 29, 2018.

(51) Int. Cl.
*A63B 41/02* (2006.01)
*A63B 45/00* (2006.01)
*A63B 41/08* (2006.01)

(52) U.S. Cl.
CPC .............. *A63B 41/02* (2013.01); *A63B 45/00* (2013.01); *A63B 41/08* (2013.01); *A63B 2209/00* (2013.01)

(58) Field of Classification Search
CPC ......... A63B 41/02; A63B 45/00; A63B 41/08; A63B 41/00
See application file for complete search history.

(56) References Cited

U.S. PATENT DOCUMENTS

| 777,045 A | * | 12/1904 | Richards | ................. B29C 31/00 |
| | | | | 156/186 |
| 1,672,174 A | * | 6/1928 | Ruedy | .................... A63B 37/00 |
| | | | | 473/598 |
| 2,053,450 A | * | 9/1936 | Twiss | ..................... A63B 41/00 |
| | | | | 156/186 |
| 2,194,132 A | * | 3/1940 | Voit | ........................ A63B 41/00 |
| | | | | 156/147 |
| 2,221,533 A | * | 11/1940 | Voit | ........................ A63B 41/08 |
| | | | | 473/604 |

(Continued)

FOREIGN PATENT DOCUMENTS

| WO | 2012151281 A1 | 11/2012 |
| WO | 2013148946 A1 | 10/2013 |

*Primary Examiner* — Steven B Wong
(74) *Attorney, Agent, or Firm* — Quinn IP Law (57) ABSTRACT

A sports ball and a method of manufacturing the same are provided. The sports ball having a bladder, an outer cover layer, and an intermediate structure disposed between the outer cover layer and the bladder. The intermediate structure includes a restriction structure comprising a plurality of overlapping layers of cross-linked polymer film wrapped about the bladder. The sports ball may be formed via the steps of surrounding the bladder, having a first initial circumferential dimension, with a plurality of overlapping layers of cross-linked polymer shrink film, such that the cross-linked shrink film forms a restriction structure in a first dimensional state; applying a heat shrinking process to the cross-linked polymer shrink film to contract the restriction structure from the first dimensional state to a second dimensional state; inflating the bladder to a second circumferential dimension; and disposing the outer cover layer and intermediate layers about the bladder and restriction structure.

18 Claims, 9 Drawing Sheets

(56) References Cited

U.S. PATENT DOCUMENTS

| | | | | |
|---|---|---|---|---|
| 2,653,818 A * | 9/1953 | Tebbetts, Jr. | ............ | A63B 39/00 473/604 |
| 2,688,488 A * | 9/1954 | Crowley | ................ | A63B 41/08 473/605 |
| 2,945,693 A * | 7/1960 | Way | ........................ | A63B 39/00 473/605 |
| 3,405,018 A * | 10/1968 | Way | ........................ | B29D 22/04 156/147 |
| 3,506,265 A * | 4/1970 | Yugi | ........................ | A63B 41/00 473/604 |
| 4,239,568 A * | 12/1980 | Takazawa | ............... | B29D 22/04 156/155 |
| 4,415,154 A * | 11/1983 | Engelhardt | ........ | A63B 69/0097 473/456 |
| 4,462,590 A * | 7/1984 | Mitchell | ................ | A63B 41/08 273/DIG. 8 |
| 4,513,058 A * | 4/1985 | Martin | .................... | C08J 7/0427 428/336 |
| 4,542,902 A * | 9/1985 | Massino | ................ | A63B 37/02 273/DIG. 20 |
| 4,570,931 A * | 2/1986 | Martin | .................... | A63B 39/06 473/596 |
| 4,660,831 A * | 4/1987 | Kralik | .................... | A63B 41/00 473/603 |
| 5,096,756 A * | 3/1992 | Walters | .................... | C08L 27/06 428/35.5 |
| 5,294,112 A * | 3/1994 | Smith | .................... | A63B 41/02 473/610 |
| 6,039,662 A * | 3/2000 | Chan | .................... | A63B 41/08 473/599 |
| 6,194,501 B1 * | 2/2001 | Okada | .................. | C08F 210/02 524/274 |
| 6,203,868 B1 | 3/2001 | Bonk et al. | | |
| 6,656,067 B2 | 12/2003 | Ou | | |
| 7,699,726 B2 | 4/2010 | Avis | | |
| 7,785,219 B2 | 8/2010 | Avis | | |
| 8,033,936 B2 | 10/2011 | Ou | | |
| 8,192,311 B2 * | 6/2012 | White | .................... | D04B 1/108 473/605 |
| 8,388,476 B2 * | 3/2013 | Ou | ........................ | A63B 41/08 473/605 |
| 8,597,144 B2 | 12/2013 | Chang et al. | | |
| 8,608,599 B2 | 12/2013 | Raynak et al. | | |
| 8,672,784 B2 * | 3/2014 | Berggren | ............... | A63B 41/04 473/610 |
| 8,708,847 B2 | 4/2014 | Berggren et al. | | |
| 8,801,553 B2 * | 8/2014 | Fujikura | ................. | A63B 41/00 473/605 |
| 8,974,329 B2 | 3/2015 | Laliberty | | |
| 8,974,330 B2 | 3/2015 | Berggren et al. | | |
| 9,017,192 B1 | 4/2015 | Silva | | |
| 9,327,167 B2 | 5/2016 | Raynak et al. | | |
| 9,370,693 B2 | 6/2016 | Berggren et al. | | |
| 9,370,695 B2 | 6/2016 | Chang et al. | | |
| 2002/0086749 A1 | 7/2002 | Ou | | |
| 2003/0228946 A1 | 12/2003 | Chan | | |
| 2004/0087396 A1 | 5/2004 | Chan | | |
| 2004/0144477 A1 * | 7/2004 | Taniguchi | ............... | A63B 45/00 156/147 |
| 2008/0044635 A1 * | 2/2008 | O'Neill | .................... | B29C 41/22 428/212 |
| 2008/0051233 A1 | 2/2008 | Nesbitt et al. | | |
| 2009/0325742 A1 * | 12/2009 | Krysiak | ................. | A63B 41/08 473/596 |
| 2010/0167850 A1 | 7/2010 | Lin | | |
| 2012/0277044 A1 | 11/2012 | Berggren et al. | | |
| 2012/0283055 A1 * | 11/2012 | Berggren | ............... | A63B 45/00 473/604 |
| 2013/0005521 A1 | 1/2013 | White et al. | | |
| 2013/0059683 A1 * | 3/2013 | Krysiak | ................. | A63B 41/02 473/597 |
| 2014/0106912 A1 | 4/2014 | Cohen et al. | | |
| 2014/0182781 A1 * | 7/2014 | Berggren | ............... | A63B 41/04 156/307.1 |
| 2016/0346626 A1 | 12/2016 | Nurnberg et al. | | |
| 2017/0050089 A1 * | 2/2017 | Velasco | .................... | A63B 45/00 |

* cited by examiner

SPORTS BALL AND METHOD OF MANUFACTURE

CROSS-REFERENCE TO RELATED APPLICATIONS

This application claims the benefit of U.S. Provisional Application No. 62/772,796, filed Nov. 29, 2018, which is hereby incorporated by reference in its entirety.

TECHNICAL FIELD

The disclosure relates to inflatable sports balls and a method of manufacturing the same.

BACKGROUND

A variety of inflatable sports balls, such as soccer balls, conventionally exhibit a layered structure that includes a casing, an intermediate structure, and a bladder. The casing forms an exterior portion of the sports ball and is generally formed from a plurality of durable and wear-resistant panels joined together along abutting edge areas (e.g., with stitching, adhesives, or bonding), i.e., via a seam. Designs such as decorative elements and holistic textural patterns may be applied to the exterior surface of the casing.

An intermediate structure forms a middle portion of the sports ball and is positioned between the casing and the bladder. Among other purposes, the intermediate structure may provide a softened feel to the sport ball, impart energy return, and restrict expansion of the bladder.

SUMMARY

A sports ball and a method of manufacturing the same are provided. The sports ball may include a bladder, an outer cover layer, and an intermediate structure disposed between the outer cover layer and the bladder. The intermediate structure includes a restriction structure comprising a plurality of overlapping layers of cross-linked polymer film wrapped about the bladder. The plurality of overlapping layers of cross-linked polymer film is configured to restrict the expansion of and maintain the shape of the bladder.

An inflatable sports ball having an outer cover layer, an intermediate structure, and a bladder defining an exterior bladder surface, may be formed via the method of manufacturing disclosed herein. First, the bladder, having a first circumferential dimension, is surrounded with a plurality of overlapping layers of cross-linked polymer film, such that the cross-linked polymer film forms a restriction structure in a first dimensional state. Next, a heat shrinking process is applied to the cross-linked polymer film to contract the restriction structure from the first dimensional state to a second dimensional state. In the second dimensional state, the restriction structure conforms to a shape of the bladder having the first circumferential dimension. The bladder is then inflated to a second circumferential dimension, wherein the exterior bladder surface places an outward bladder force upon the restriction structure and the restriction structure places an inward restriction force upon the bladder exterior surface to restrain the expansion of bladder. The outer cover layer is then disposed about the bladder and the restriction structure.

DETAILED DESCRIPTION

While the present disclosure may be described with respect to specific applications or industries, those skilled in the art will recognize the broader applicability of the disclosure. Those having ordinary skill in the art will recognize that terms such as "above," "below," "upward," "downward," etc., are used descriptively of the figures, and do not represent limitations on the scope of the disclosure, as defined by the appended claims. Any numerical designations, such as "first" or "second" are illustrative only and are not intended to limit the scope of the disclosure in any way.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The terms "a," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, a disclosure of a range is to be understood as specifically disclosing all values and further divided ranges within the range.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The following discussion and accompanying figures disclose various sports ball configurations and methods relating to the manufacturing of the sport balls. Although the sports ball is depicted as a soccer ball in the associated figures, concepts associated with the configurations and methods may be applied to various types of inflatable sport balls, such as basketballs, footballs (for either American football or rugby), volleyballs, water polo balls, etc.

Referring to the drawings, wherein like reference numerals refer to like components throughout the several views, an inflatable sports ball 10 is provided. In a general sense, the sports ball 10 of the present disclosure includes a casing 12 disposed about an interior bladder 16. The casing 12 includes an outer cover layer 24 and an intermediate structure 14 disposed between the outer cover layer 24 and the interior bladder 16. The intermediate structure 14 includes a restriction structure 22 configured to restrict the expansion of and maintain the shape of the interior bladder 16. The restriction structure 22 comprises a plurality of overlapping layers of cross-linked polymer film, which is applied to the interior bladder 16 via a wrapping technique under tension. At least one of the plurality of overlapping layers is disposed in contact with an exterior bladder surface 19.

In a general sense, the plurality of overlapping layers of cross-linked polymer film is a beneficial configuration for the restriction structure 22, because the cross-linked polymer film exhibits improved tensile strength, tear strength, and elasticity. As such, the cross-linked polymer film, when applied to the bladder 16 under tension induces a static stress on the interior bladder 16, which raises the hysteresis of the bladder 16 material and allows the overall package of the sports ball 10 to exhibit improved resilience and improved rebound properties over conventional designs. Use of the cross-linked polymer film as the material for the restriction structure 22 also allows for consistency in manufacturing, as well as optimization of the dimensions, e.g., size, weight, and sphericity of the sports ball 10.

As shown in FIGS. 1-5, the sports ball 10 may be an inflatable sports ball such as a soccer ball or the like. A sports ball 10 having the general configuration of a soccer ball is depicted in FIGS. 1-5. As shown in FIGS. 1, 2, 3A, 4A, and 7, the sports ball 10 may have a layered structure including an interior 16, an intermediate structure 14, and an outer cover layer 24. The outer cover layer 24 forms an exterior portion of the sports ball 10. The interior 16 forms an interior portion of the sports ball 10.

The interior 16 may be a bladder (FIGS. 2, 3A, 4A, and 7) having an exterior bladder surface 19. The bladder 16 may be formed from a variety of elastomeric or otherwise stretchable materials. More particularly, the bladder 16 may be formed of a Thermoplastic Polyurethane (TPU) material or a rubber material.

In order to facilitate inflation (i.e., fill the interior with pressurized air), the bladder 16 generally includes a valved opening 17 that extends through the outer cover layer 24 and the intermediate structure 14, thereby being accessible from the exterior surface 13 of the sports ball 10. Upon inflation, the bladder 16 is pressurized and the pressurization induces the exterior bladder surface 19 and the exterior surface 13 to be non-planar and substantially spherical surfaces, as the sports ball 10 takes on a substantially spherical shape.

The casing 12 is disposed about the interior bladder 16 and forms an exterior portion of the sports ball 10, which further defines the exterior surface 13. As shown in FIGS. 2 and 7-10G, the casing 12 may comprise a layered structure including an outer cover layer 24 and an intermediate structure 14 located interior to the outer cover layer 24 between the outer cover layer 24 and the bladder 16. Said another way, the intermediate structure 14 is disposed between the outer cover layer 24 and the bladder 16.

The intermediate structure 14 forms a middle portion of the sport ball and is positioned between the outer cover layer 24 and the bladder 16. Among other purposes, the intermediate structure 14 may provide a softened feel to the sport ball 10, impart energy return, and restrict expansion of the bladder 16. In some configurations, the intermediate structure 14 or portions of the intermediate structure 14 may be bonded, joined, or otherwise incorporated into the outer cover layer 24 as a backing material. In other configurations, the intermediate structure 14 or portions of the intermediate structure 14 may be bonded, joined, or otherwise incorporated into the interior 16.

The intermediate structure 14 includes a restriction structure 22 and a plurality of intermediate layers 26a, 26b. The restriction structure 22 is disposed in contact with the bladder exterior surface 19. The plurality of intermediate layers 26a, 26b are disposed between the outer cover layer 24 and the restriction structure 22, and may be bonded, joined, or otherwise incorporated into the outer cover layer 24 as a backing material. The intermediate layers 26a, 26b may include a first intermediate layer 26a and a second intermediate layer 26b. The first intermediate layer 26a is disposed between the second intermediate layer 26b and the outer cover layer 24. The second intermediate layer 26b is disposed between the first intermediate layer 26a and the restriction structure 22. The intermediate layers 26a, 26b may be comprised of a suitable textile material or foam material. Examples of suitable polymer foam materials include, but are not limited to, polyurethane, ethylvinylacetate, and the like. Examples of suitable textile materials include, but are not limited to, a woven or knit textile formed from polyester, cotton, nylon, rayon, silk, spandex, or a variety of other materials. A textile material may also include multiple materials, such as a polyester and cotton blend. In one example configuration, at least one of the intermediate layers 26a, 26b comprises a thermoplastic foam material, and more particularly, a Thermoplastic Polyurethane (TPU) foam material. The intermediate layers 26a, 26b provide a softened feel to the sport ball 10 and provide insulation of the bladder 16 to minimize sound generated by striking the air-filled and pressurized bladder 16.

The restriction structure 22 may have a variety of configurations or functional purposes, including, but not limited to, restricting expansion of the bladder 16, imparting energy return, and improving rebound properties of the sports ball 10. Upon pressurization, the bladder 16 induces the sports ball 10 to take on a non-planar and substantially spherical shape. More particularly, pressure within bladder 16 causes the exterior bladder surface 19 to place an outward force upon the restriction structure 22, which is disposed in contact with the bladder exterior surface 19. In turn, the restriction structure 22 places an outward force upon the casing 12, particularly the second intermediate layer 26b. Said another way, bladder 16 places an outward force upon restriction structure 22, but the stretch characteristics of restriction structure 22 effectively mitigate the outward force from inducing significant tension in casing 12. As such, restriction structure 22 restrains pressure from the bladder 16, while permitting outward forces to induce a non-planar and substantially spherical shape in the casing 12, thereby imparting a spherical shape to the sports ball 10.

As such, in general, the restriction structure 22 is formed from materials with a limited degree of stretch in order to limit the expansion of bladder 16 and also limit tension in casing 12. Accordingly, the construction of the restriction structure 22 may vary significantly to include a variety of configurations and materials.

As examples, conventional restriction structures may be formed from (a) thread, yarn, or filament that is repeatedly wound around bladder 16 in various directions to form a mesh that covers substantially all of a bladder 16, (b) a plurality of generally flat or planar textile elements stitched together to form a structure that extends around bladder 16, (c) a plurality of generally flat or planar textile strips that are impregnated with latex and placed in an overlapping configuration around bladder 16, or (d) a substantially seamless textile. In utilizing a conventional restriction structure such as (a)-(d) detailed herein above, there is generally a large amount of material needed to provide the necessary restriction of the bladder 16, which causes difficulties in controlling the dimensions, i.e., the size, weight, and sphericity of the resultant sports ball 10. More particularly, the amount of material utilized for a conventional restriction structure 22 to achieve the desired sound characteristics, improved resilience, and improved rebound properties often produces a ball 10 that is heavier or larger in diameter and/or circumference than desired. Application of conventional restriction structures to the bladder 16 in the manufacturing process also produces inconsistencies in the dimensions, i.e., the size, weight, and sphericity of the resultant sports ball 10.

These inconsistencies can be solved via the present disclosure. As shown in FIGS. 3A-3C, 4A-4C, and 7 the restriction structure 22 of the present disclosure is composed of a plurality of overlapping layers of cross-linked polymer film. The cross-linked polymer film may exhibit improved tensile strength, tear strength, and elasticity. Said another way, the cross-linked polymer film may have a high tensile strength, a high tear strength, and a high elasticity reflected by a low stiffness modulus.

The biaxial stretching process for polymer films is performed in two directions within the respective film. The machine direction is the direction that the film moves through the machine from start to finish in the stretching process. The transverse direction is the direction perpendicular to the machine direction. Accordingly, suitable cross-linked polymer films may have a tensile strength of from about 13,000 PSI to about 20,000 PSI in the machine direction, and a tensile strength of from about 13,000 PSI to about 20,000 PSI in the transverse direction. Suitable cross-linked polymer films may have a tear strength from about 15 grams-force to about 50 grams-force in the machine direction and a tear strength from about 15 grams-force to about 50 grams-force in the transverse direction. Suitable cross-linked polymer films may have a stiffness modulus of from about 35,000 PSI to about 60,000 PSI.

In one example configuration, the cross-linked polymer film may be a cross-linked thermoplastic such as a cross-linked Thermoplastic Polyurethane (TPU). In another example configuration, the cross-linked polymer film may be a cross-linked polyolefin film, and more particularly, a cross-linked polyolefin shrink wrap. The cross-linked polyolefin shrink wrap may have a thickness of from about thirty-five (35) gauge (about 8.80 microns or about 0.00885 millimeters) to about one hundred and fifty (150) gauge (about 38 microns 0.0380 millimeters). The cross-linked polyolefin shrink wrap may have a thickness of sixty (60) gauge (about 15 microns or 0.0152 millimeters) or greater.

Figure 11:
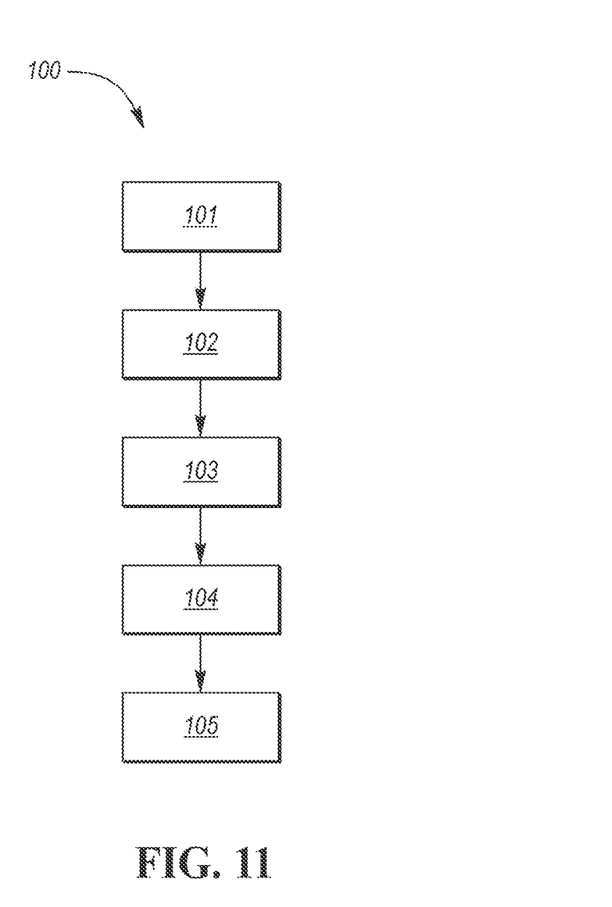
FIG. 11 is a flow diagram detailing the method of manufacturing the sports ball.

Referring to FIG. 11, the cross-linked polymer film maybe produced as part of the method of manufacture 100. Namely, at step 101 a cross-linkable polymer film is exposed to a cross-linking process to form the cross-linked polymer film. Suitable cross-linking processes may include, chemical reactions that are initiated by heat, pressure, change in pH, or radiation. For example, mixing of an unpolymerized or partially polymerized resin with specific chemicals called crosslinking reagents, results in a chemical reaction that forms cross-links. Cross-linking can also be induced in materials that are normally thermoplastic or thermosetting polymers through exposure to a heat source or a radiation source, e.g., electron beam exposure, gamma-radiation, or ultra-violet light.

A cross-linked polymer film is a beneficial material for the restriction structure 22, because a cross-linked polymer film exhibits improved tensile strength, tear strength, and elasticity, as well as increased puncture resistance. Improved tensile strength and elasticity allows the cross-linked polymer film to induce the needed static stress on the bladder 16, with less volume and weight of material and more overall consistency than conventional restriction structures. The improved tensile strength and elasticity of cross-linked polymer film that comprises the restriction structure 22 of the present disclosure, when applied to the bladder 16 under tension, allows the restriction structure 22, not only to restrict expansion of the bladder 16, but also to raise the hysteresis of the bladder 16 material, thereby allowing the overall package of the sports ball 10 to exhibit improved resilience and improved rebound properties. Use of the cross-linked polymer film as the material for the restriction structure 22, also allows for consistency in manufacturing and optimization of the dimensions, e.g., size, weight, and sphericity of the resultant sports ball 10, when manufactured via the method of manufacturing 100 further detailed in FIG. 11.

Figure 2:
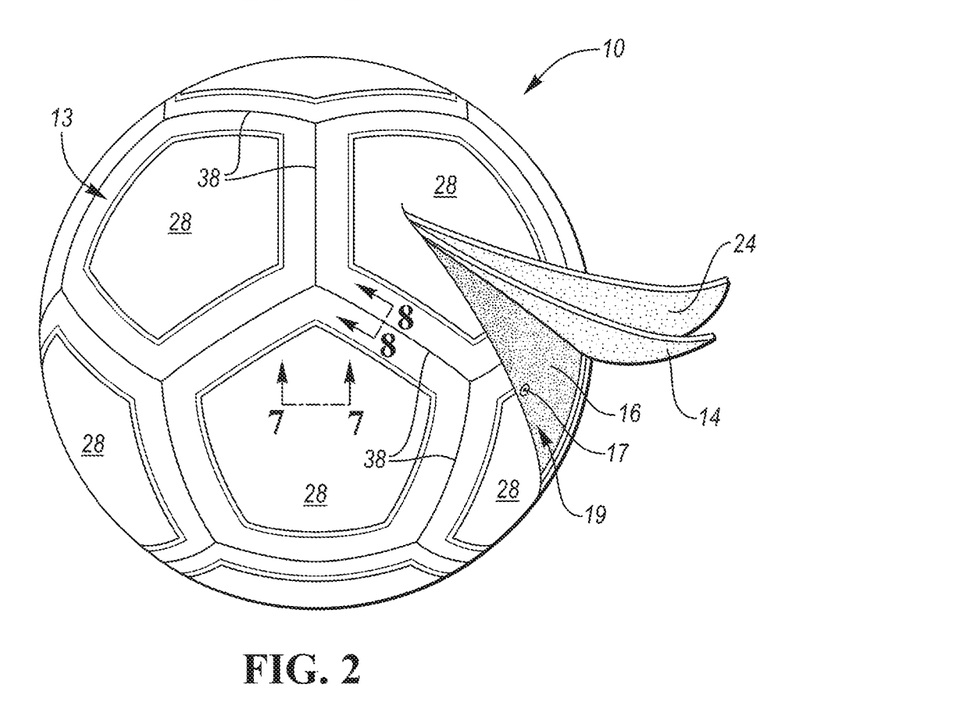
FIG. 2 is a schematic perspective view of an example inflatable sports ball, wherein the ball includes an interior bladder and a cover, the cover including an outer substrate layer and an intermediate structure.
Figure 3A:
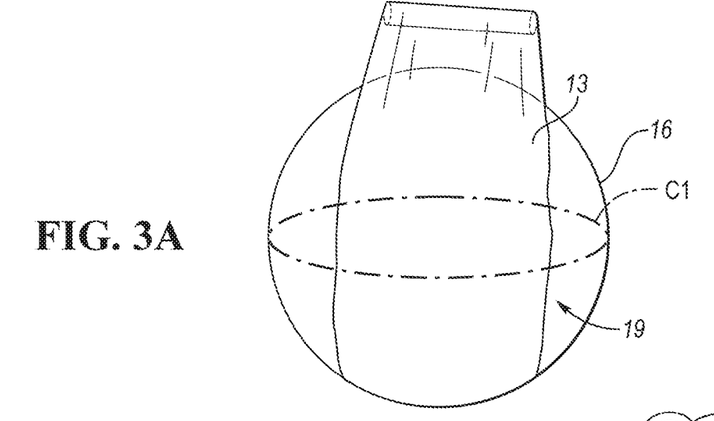
FIG. 3A is a schematic perspective view of one example interior bladder wrapped with one layer of cross-linked polymer film, wherein the cross-linked polymer film is a single-layer-continuous sheet of cross-linked polymer film.
Figure 3B:
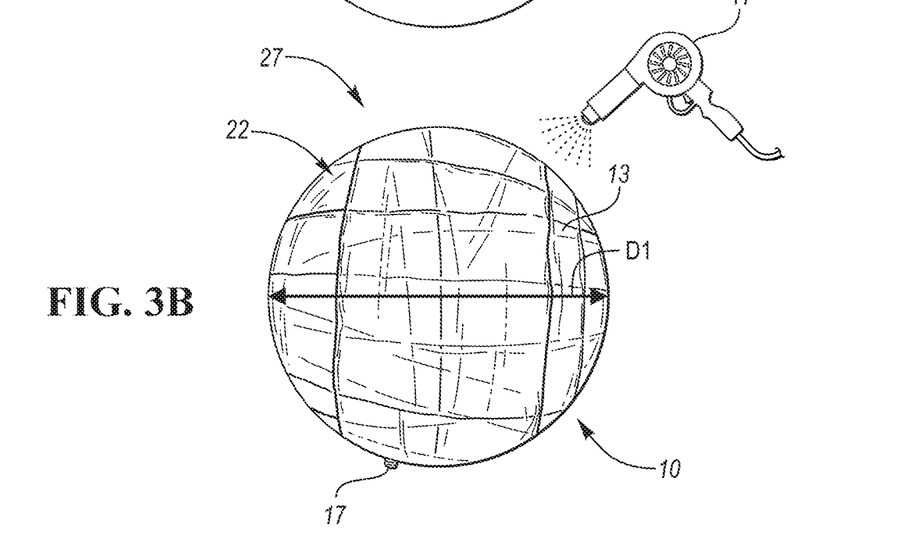
FIG. 3B is a schematic perspective view of one example interior bladder wrapped with a plurality of overlapping layers of cross-linked polymer film, configured to function as a restriction structure, wherein the restriction structure has a first diameter.
Figure 3C:
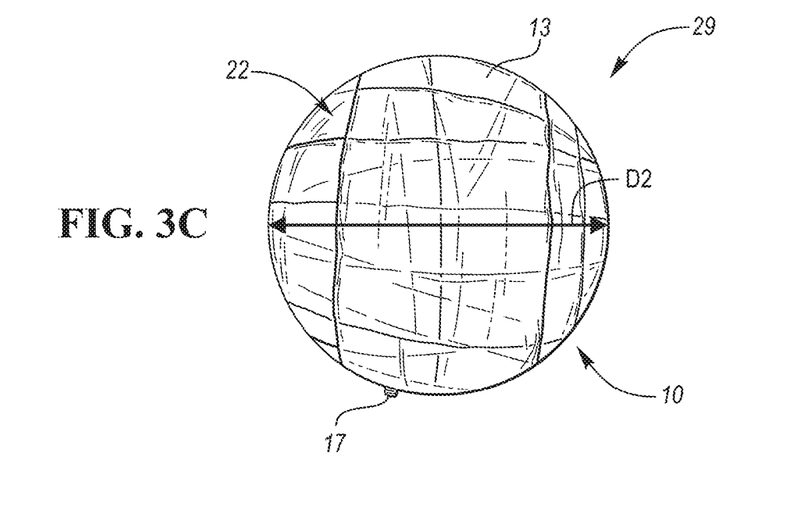
FIG. 3C is a schematic perspective view of one example interior bladder wrapped with a plurality of overlapping layers of cross-linked polymer film, configured to function as a restriction structure, wherein the restriction structure has a second diameter.
Figures 4A, 4B:
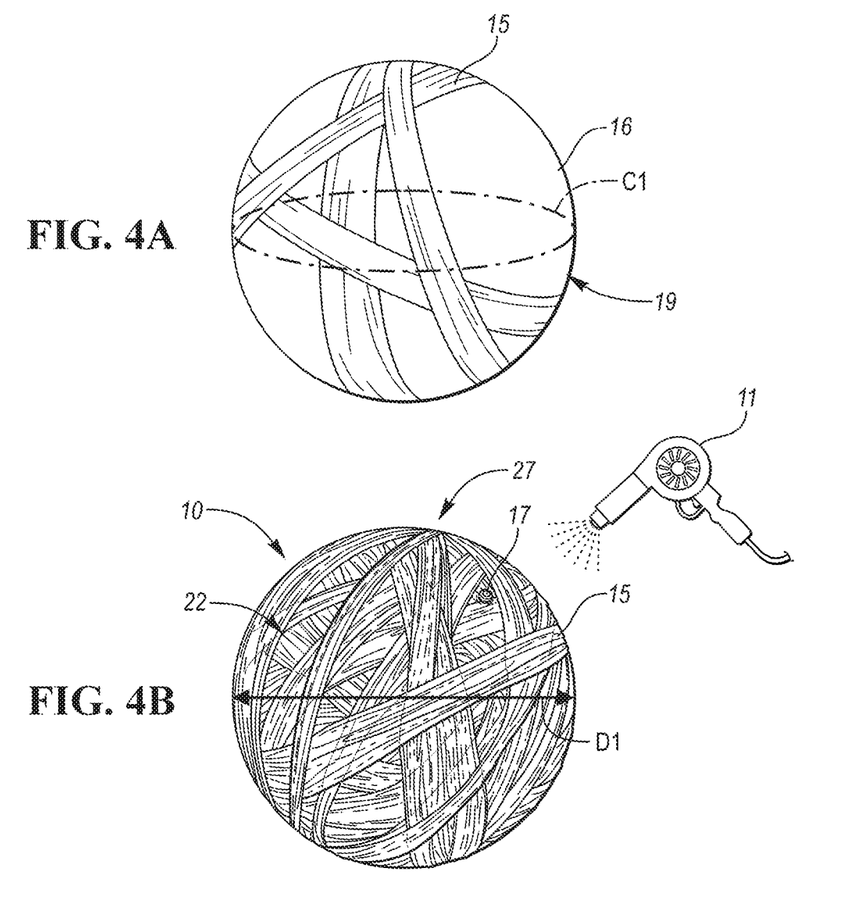
FIG. 4A is a schematic perspective view of one example interior bladder wrapped with plurality of overlapping layers of cross-linked polymer film, configured to function as a restriction structure, wherein the cross-linked polymer film is bunched or wound into a continuous strip of cross-linked polymer film and wrapped about the interior bladder under tension.
FIG. 4B is a schematic perspective view of one example interior bladder wrapped with a plurality of overlapping layers of cross-linked polymer film, configured to function as a restriction structure, wherein the restriction structure has a first diameter.

Referring to FIGS. 3A-3C, 4A-4C, 7, and 11, more particularly, in one example embodiment, the restriction structure 22 comprises a plurality of overlapping layers of cross-linked polymer film wrapped about the bladder 16. As such, the resultant restriction structure 22 is formed in a non-planar configuration and is shaped to conform with exterior bladder surface 19. Further, at least one of the plurality of overlapping layers of cross-linked polymer film is disposed in contact with the exterior bladder surface 19 (FIGS. 2, 3A, and 4A).

As detailed in the method of manufacture 100 of FIG. 11 and in FIGS. 3A-3C, and 4A-4C, the bladder 16 is provided in an underinflated state, having a first circumferential dimension C1. At step 102, the bladder 16 having the first circumferential dimension C1, is surrounded with a cross-linked polymer shrink film to form the restriction structure 22. The bladder 16 is wrapped with the cross-linked polymer shrink film, such that a plurality of overlapping layers of cross-linked polymer shrink film are disposed about the bladder 16, wherein at least one of the plurality of overlapping layers is disposed in contact with the exterior bladder surface 19.

The wrapping of the cross-linked polymer shrink film may be accomplished in a variety of ways. In one example (FIGS. 3A-3C), the cross-linked polymer shrink film may be applied, under tension, in flat sheet to form a plurality of overlapping layers thereof about the bladder 16. Said another way, a single-layer-continuous sheet 13 of the cross-linked polymer shrink film may be placed under tension, and the wrapped about the bladder 16 while the continuous sheet 13 of the cross-linked polymer shrink film is under tension to create the plurality of overlapping layers of the cross-linked polymer shrink film.

In another example (FIGS. 4A-4C), the cross-linked polymer shrink film may be overlapped upon itself or bunched and wound into narrower, but thicker pieces, and then applied, under tension, to the bladder 16 in a plurality of overlapping layers. Said another way, a sheet of the cross-linked polymer shrink film may be bunched, gathered, or wound into a continuous strip 15 of the cross-linked polymer shrink film, placed under tension, and wrapped about the bladder 16 while the continuous strip 15 of the cross-linked polymer shrink film is under tension to create the plurality of overlapping layers of the cross-linked polymer shrink film that form the restriction structure 22.

Figure 4C:
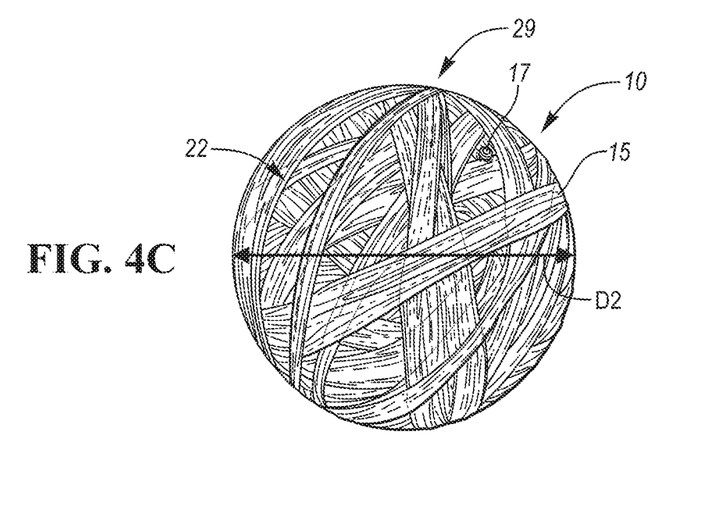
FIG. 4C is a schematic perspective view of one example interior bladder wrapped with a plurality of overlapping layers of cross-linked polymer film, configured to function as a restriction structure, wherein the restriction structure has a second diameter.

The example shown in FIGS. 4A-4C forms a thicker restriction structure 22 than the example shown in FIG. 3A-3C, which may be beneficial when attempting to increase the size, i.e., diameter and/or circumference of the resultant sports ball 10.

In another example, the bladder 16 may be placed within an envelope of cross-linked polymer film tubing and heat sealed therein, via a heat seal machine. Said another way, the bladder 16 may be inserted into a plurality of tubular envelopes of the cross-linked polymer shrink film to create the plurality of overlapping layers of the cross-linked polymer shrink film and heat sealed therein. This process may be repeated until the desired number of overlapping layers of cross-linked polymer shrink film are distributed over and/or wrapped about the bladder 16.

After the bladder 16 is wrapped with the plurality of overlapping layers of cross-linked polymer shrink film, the plurality of overlapping layers of cross-linked polymer shrink film creates a restriction structure 22 in a first dimensional state 27. In the first dimensional state 27, the restriction structure 22 disposed about and coupled with the bladder 16 has a first diameter D1.

At step 103, a heat shrinking process is applied to the plurality of overlapping layers of cross-linked polymer shrink film comprising the restriction structure 22 to promote an even distribution of the cross-linked polymer film about the bladder 16. The even distribution of the overlapping layers of cross-linked polymer film within the restriction structure 22 allows for greater consistency in the size and sphericity of the resultant sports ball 10. In one example, the heat shrinking process may include applying a heat gun 11 (FIGS. 3B and 4B) to the plurality of overlapping layers of cross-linked polymer shrink film that comprise the restriction structure 22.

Upon applying the heat shrinking process to the plurality of overlapping layers of cross-linked polymer shrink film of the restriction structure 22, the restriction structure 22 contracts from the first dimensional state 27 to a second dimensional state 29. In the second dimensional state 29, the restriction structure 22 conforms to a shape of the underinflated bladder 16 having the first circumferential dimension C1. After contraction, due to the heat shrinking process, the restriction structure 22 disposed about and coupled with the underinflated bladder 16 has a second diameter D2. The second diameter D2 of the restriction structure 22 coupled with the underinflated bladder 16 in the first dimensional state is smaller than the first diameter D1 of the restriction structure 22 coupled with the bladder 16 in the first dimensional state 27.

At step 104, the bladder 16 is fully inflated, i.e., further pressurized or inflated via the valved opening 17 to a second circumferential dimension C2. During further inflation, the exterior bladder surface 19 places an outward bladder force upon the restriction structure 22 and the restriction structure 22 places an inward restriction force upon the bladder exterior surface 19 to restrain the expansion of bladder 16. The second circumferential dimension C2 of the bladder 16 is larger than the first circumferential dimension C1 of the bladder 16.

At step 105, the outer cover layer 24 and the plurality of intermediate layers 26a, 26b, which are coupled with the outer cover layer 24 as backing material, are disposed about the interior bladder 16 and the restriction structure 22.

In some embodiments, the outer cover layer 24 may be composed of a variety of suitable materials including leather and/or suitable polymeric materials. In some configurations the outer cover layer 24 is composed of a polymeric material, a polymer foam material, or the like. Examples of suitable polymeric materials include, but are not limited to, polyurethane, polyvinylchloride, polyamide, polyester, polypropylene, polyolefin, and/or other materials that are generally durable and wear-resistant. In one example, the outer cover layer 24 may be formed of a thermoplastic polyurethane material (TPU).

As shown in FIGS. 1, 2, 5, and 6A-6E, the outer cover layer 24 may be generally formed by a plurality of adjoining panels 28, wherein each panel 28 has a respective panel surface that defines a portion of the exterior surface 13. The plurality of panels 28 may comprise the conventional twelve (12) panels or any other number of panels 28, for example, four joined panels 28 each having nine edges 36 and having a generally triangular shape that is formed from three pentagons. Panels 28 may also have a variety of other shapes (e.g., triangular, square, rectangular, trapezoidal, round, oval) that combine in a tessellation-type manner to form the outer cover layer 24. Further, panels 28 may also exhibit non-regular or non-geometrical shapes. The outer cover layer 24 may also exhibit a substantially uniform or unbroken configuration that does not include panels 28 joined at abutting edge areas 36 via seams 38, or include fewer panels 28.

As shown in FIGS. 1, 2, 5, 6A-6E, 8, 9, and 10A-10G, the outer cover layer 24 may further define a plurality of surface features 34, 38, 58. The plurality of surface features 34, 38, 58 may include a first plurality of indentations 38, a second plurality of indentations 34, and at least one protrusion 58. The exterior surface 13 may define a plurality of land areas 60 disposed between the respective indentations 34, 38 and/or protrusions 58. Further, the protrusions 58, the land areas 60, the first plurality of indentations 38, and second plurality of indentations 34 may cooperate to define a topographical arrangement 56 across the exterior surface 13 of the sports ball 10.

Figure 8:
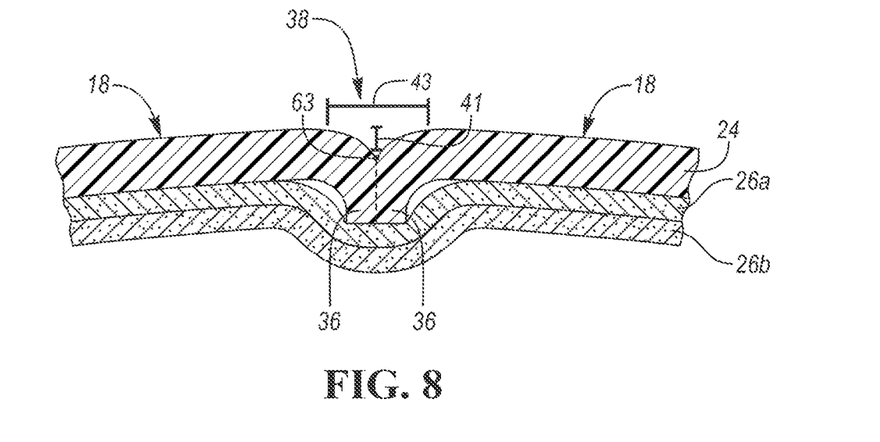
FIG. 8 is an enlarged, schematic, example cross-section of an example indentation, wherein the indentation is defined as a seam.

As shown in FIG. 8, the first plurality of indentations 38 may have a first indentation terminus 63 radially-spaced apart from the outer cover layer surface 18 in a direction toward the interior bladder 16. Further, each of the first plurality of indentations 38 has a first indentation depth 41 and a first indentation width 43. The first indentation terminus 63 is radially-spaced apart from the outer cover layer surface 18 by the first indentation depth 41. In one example, as shown in FIG. 8, the first plurality of indentations 38 may be defined as a plurality of seams 38 configured to couple the plurality of panels 28. In one example, the first plurality of indentations 38 are defined as seams, the first indentation width 43 is a seam width and the first indentation depth 41 is a seam depth.

Figure 1:
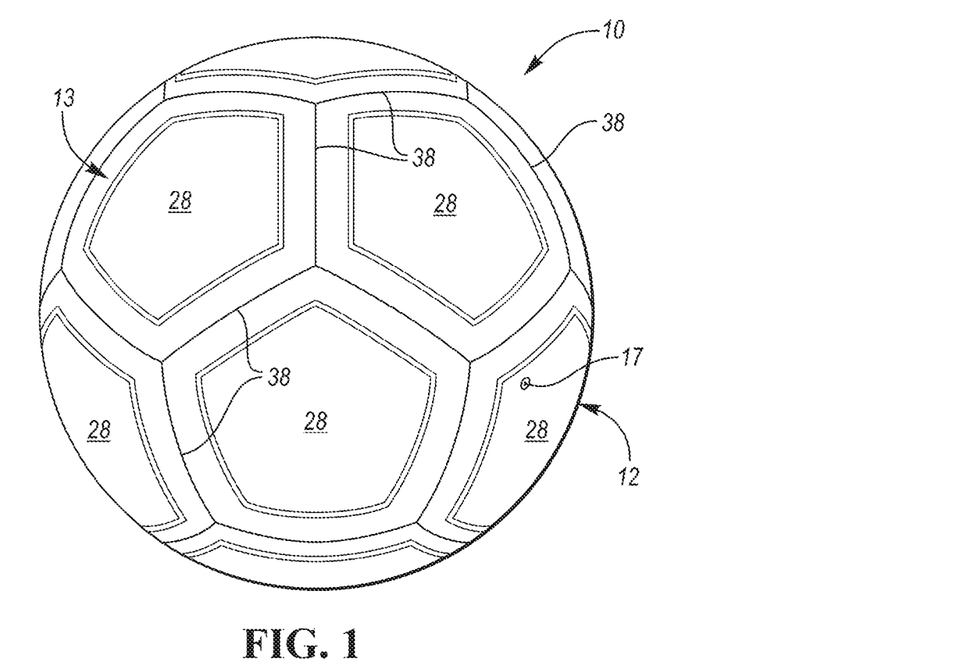
FIG. 1 is a schematic perspective view of an example inflatable sports ball.
Figure 5:
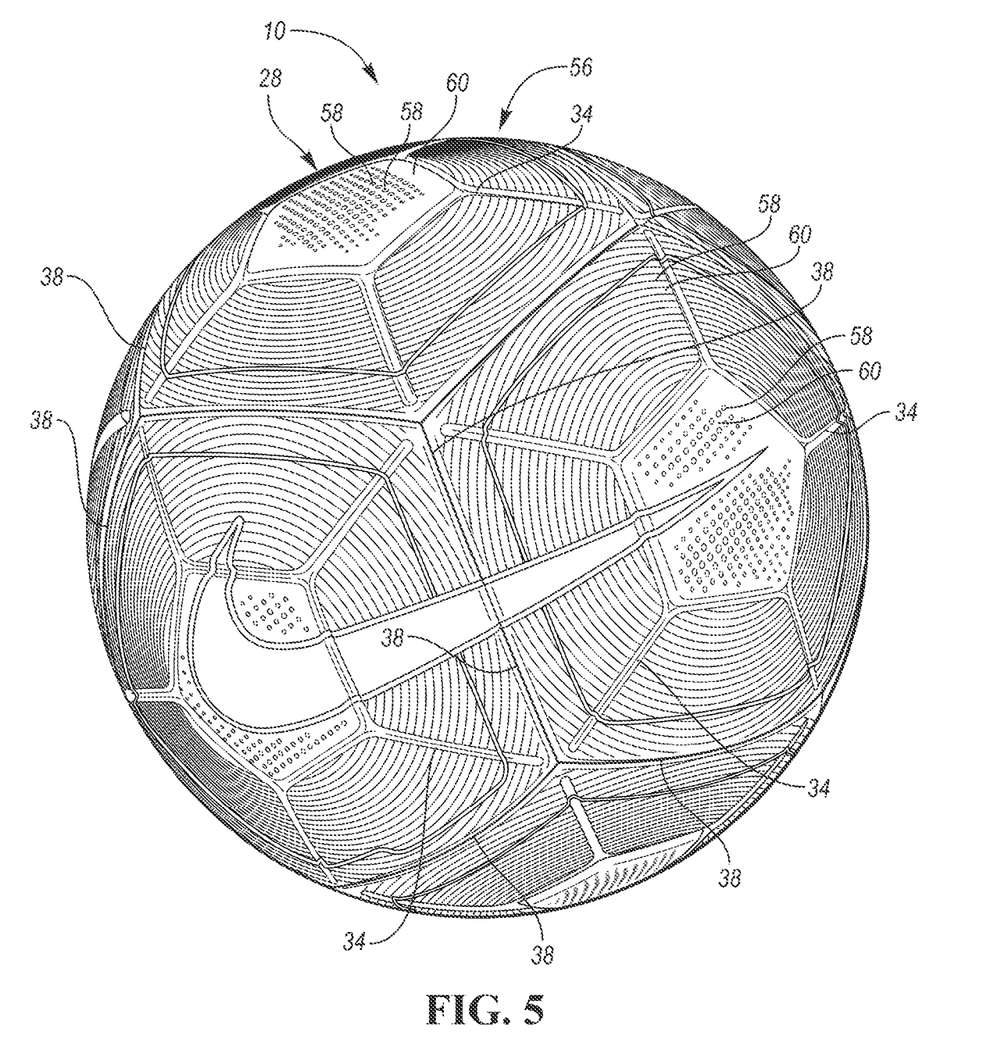
FIG. 5 is a schematic perspective view of an example sports ball having a plurality of surface features including a first plurality of indentations, a second plurality of indentations, and at least one protrusion.

The respective panels 28 may be adjoined together along abutting edge areas 36 (FIG. 6A-6E) via at least one seam 38 (FIGS. 1-2 and 5). The panels 28 may be coupled along the abutting edge areas 36 by the seam 38 with stitching, bonding, welding, adhesives, or another suitable coupling method. As utilized herein, the term "welding" or variants thereof (such as "thermal bonding") is defined as a technique for securing two elements to one another that involves a softening or melting of a polymer material within at least one of the elements such that the materials of the elements are secured to each other when cooled. Similarly, the term "weld" or variants thereof (e.g., "thermal bond") is defined as the bond, link, or structure that joins two elements through a process that involves a softening or melting of a polymer material within at least one of the elements such that the materials of the elements are secured to each other when cooled.

An example of welded seams 38 is disclosed in U.S. Pat. No. 8,608,599 to Raynak, et al., which is hereby entirely incorporated herein by reference. U.S. Pat. No. 8,608,599 to Raynak, et al. generally discloses examples of welded seams, in that welding generally produces a heat affected zone in which the materials of the two joined components are intermingled. This heat affected zone may be considered a "weld" or "thermal bond." Further, welding may involve (a) the melting or softening of two panels that include polymer materials such that the polymer materials from each panel intermingle with each other (e.g., diffuse across a boundary layer between the polymer materials) and are secured together when cooled, as well as (b) the melting or softening of a polymer material in a first panel such that the polymer material extends into or infiltrates the structure of a second panel (e.g., infiltrates crevices or cavities formed in the second panel or extends around or bonds with filaments or fibers in the second panel) to secure the panels together when cooled. Further, welding may occur when only one panel includes a polymer material or when both panels include polymer materials.

Referring to FIGS. 5, 6A-6E and 10A-10G, each of the second plurality of indentations 34 may have a second indentation terminus 65 radially-spaced apart from the outer cover layer surface 18 in a direction toward the interior bladder 16. Further, each of the second plurality of indentations 34 has a second indentation depth 67 and a second indentation width 61. The second indentation terminus 65 is radially-spaced apart from the outer cover layer surface 18 by the second indentation depth 67.

Figure 6A:
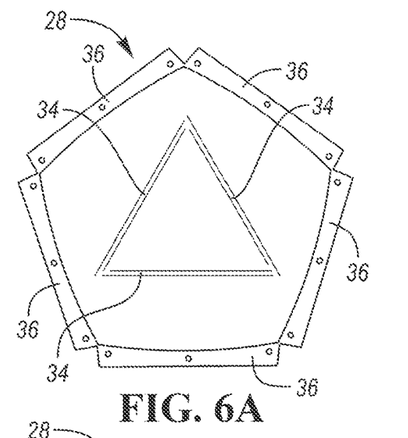
FIG. 6A is an example schematic plan view of an example panel having surface features including a second plurality of indentations.
Figure 6B:
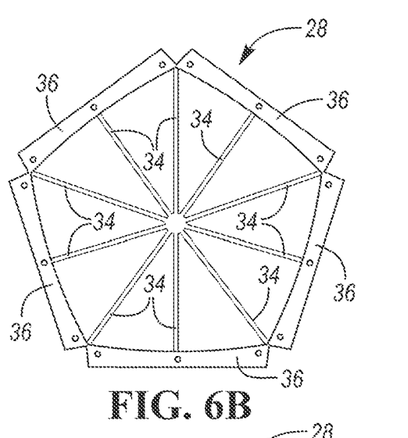
FIG. 6B is an example schematic plan view of an example panel having surface features including a second plurality of indentations.
Figure 6C:
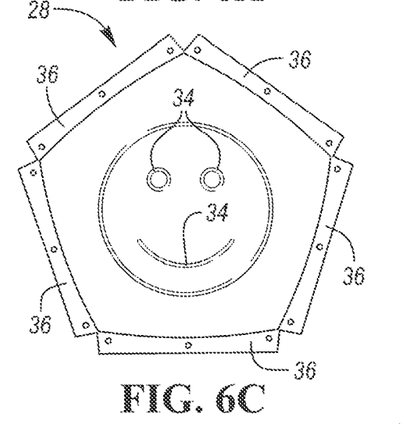
FIG. 6C is an example schematic plan view of an example panel having surface features including a second plurality of indentations.
Figure 6D:
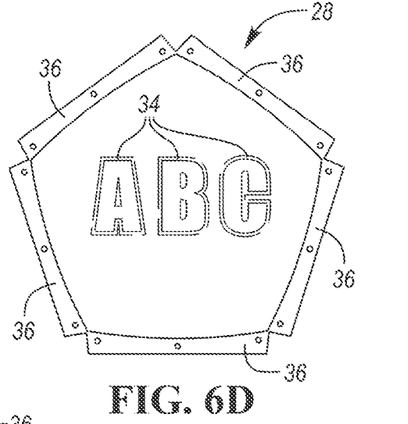
FIG. 6D is an example schematic plan view of an example panel having surface features including a second plurality of indentations.

The second plurality of indentations 34 may be defined as a plurality of channels. In some example embodiments, the channels 34 may be spaced apart from the seams 38 of the sport ball 10 (FIGS. 6A, 6C, 6D, 6E). In other example embodiments, the channels 34 may extend to edges 36 of the panels 28 and, thus, continue across a respective seam 38 (FIG. 6B). More particularly, a channel 34 on a first panel and a channel 34 on a second panel may be in substantial alignment with one another across a respective seam 38. This may also enable patterns, arrangements, or other designs to be carried across multiple panels, bridging seams 38 between the panels 28. Channels 34 may impart various advantages to ball 10. For example, channels 34 may enhance the aerodynamics of ball 10, provide a greater amount of consistency or control over ball 10 during play, e.g., during kicking, dribbling, or passing, improve ball feel, and provide for water channeling.

Channels 34 may be formed in the outer cover layer 24 via a variety of manufacturing processes including, but not limited to, debossing. Examples of a manufacturing process for forming channels 34 are disclosed in U.S. Pat. No. 9,370,693 to Berggren, et al., which is hereby entirely incorporated by reference herein. U.S. Pat. No. 9,370,693 to Berggren, et al. generally discloses a variety of manufacturing processes that may be utilized to form debossed features in panels. In one example, one of the panels is located on a platen. A press plate is positioned above the platen and includes a protrusion having a predetermined shape. The protrusion presses into and heats the areas of panel forming the debossed features. The press plate then moves away from the panel to substantially complete the formation of the debossed feature.

As shown in FIGS. 10A-10G, each channel 34 has a channel terminus 65 that is radially-spaced apart from the outer cover layer surface 18 in a direction toward the interior bladder 16. Further, each channel 34 has a channel depth 67 and a channel width 61. The channel terminus 65 is radially-spaced apart from the outer cover layer surface 18 the channel depth 67.

The channels 34 are formed in the outer cover layer 24 and extend toward the interior bladder 16. The intermediate layers 26a, 26b are positioned between outer cover layer 24 and the restriction structure 22. The outer cover layer 24 may be bonded to one of the intermediate layers 26a, 26b at the respective channel 34. More particularly, the outer cover layer 24 may be welded directly to the second intermediate layer 26b at the channel terminus 65 of the respective channel 34 (FIGS. 10A-C and 10E-G), such that the outer cover layer 24 extends through an entirety of the channel depth 67 at each of the channels 34.

The channel 34 may include an exterior indentation 82 and an interior indentation 84. The exterior indentation 82 has the terminus 65 that is radially-spaced apart from the outer cover layer surface 18 by the channel depth 67.

Figure 10A:
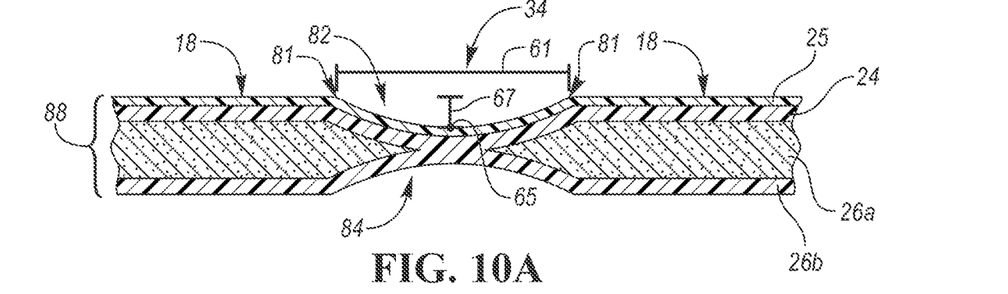
FIG. 10A is an enlarged, schematic, example cross sectional view of an example indentation, wherein the indentations are defined as channels.
Figure 10B:
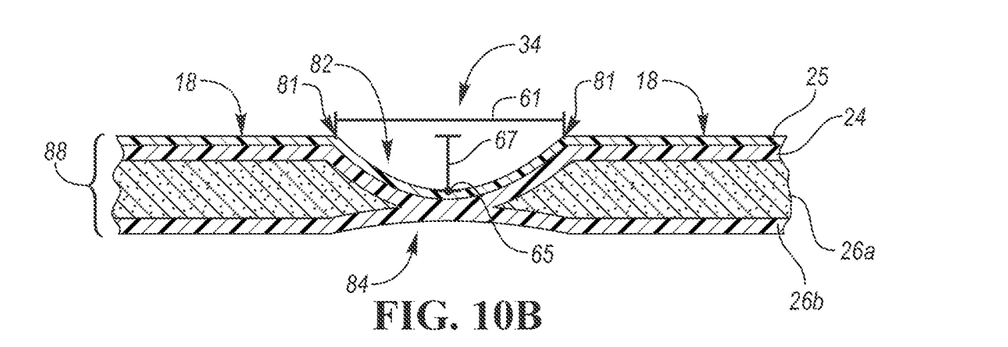
FIG. 10B is an enlarged, schematic, example cross sectional view of an example indentation, wherein the indentations are defined as channels.
Figure 10C:
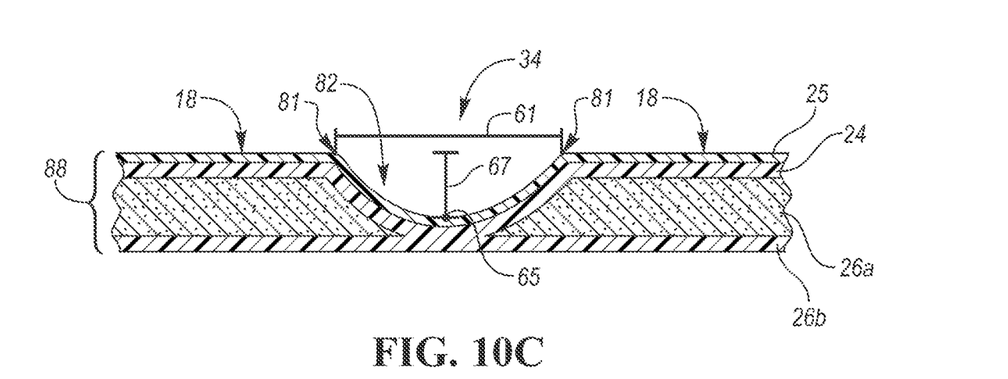
FIG. 10C is an enlarged, schematic, example cross sectional view of an example indentation, wherein the indentations are defined as channels.

The specific configuration of the channel 34 may vary considerably. Referring to FIGS. 10A-10D, the exterior and interior indentations 82 and 84 may have a generally rounded configuration. As depicted in FIG. 10A the interior and exterior indentations 82 and 84 extend to an approximate midpoint of the thickness 88 of the panel cross-section. In another configuration, as depicted in FIG. 10B, the exterior indentation 82 extends through more of the thickness 88 of panel cross section than the interior indentation 84. In yet another configuration, as depicted in FIG. 10C, the exterior indentation 82 extends through substantially all of the thickness 88 of panel cross-section. As also shown in FIG. 10C, in some embodiments, the second intermediate layer 26b may have a substantially planar configuration opposite the exterior indentation 82. Said another way, in some embodiments, the channel 34 may have only an exterior indentation 82 and no interior indentation 84.

Figure 10D:
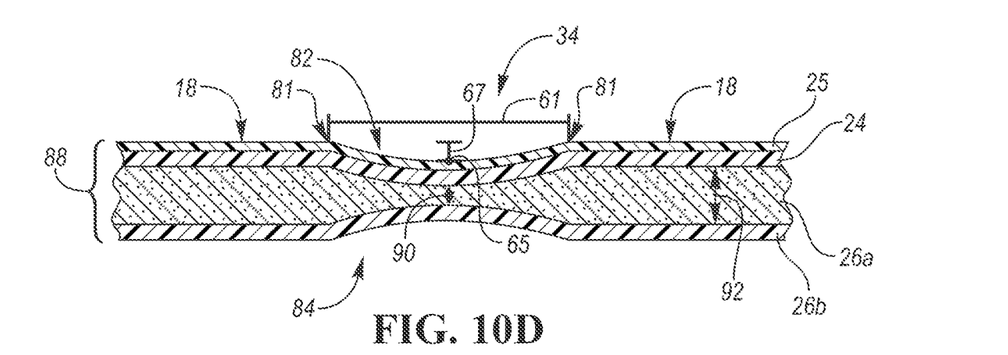
FIG. 10D is an enlarged, schematic, example cross sectional view of an example indentation, wherein the indentations are defined as channels.

Referring to FIG. 10D, indentations 82 and 84, as well as the outer cover layer 24 and the second intermediate layer 26b, may be spaced from each other, such that a portion of the first intermediate layer 26a extends between indentations 82 and 84 and between the outer cover layer 24 and the second intermediate layer 26b. In this configuration, the outer cover layer 24 is bonded to the first intermediate layer 26a at the channel 34. In such an example, the first intermediate layer 26a has a first thickness 90 between indentations 82 and 84 and at the terminus 65 of the exterior indentation 82. In the same example, the first intermediate layer 26a has a second thickness 92 between the outer cover layer 24 and the second intermediate layer 26b, in an area spaced apart from indentations 82 and 84 and the terminus 65 of the exterior indentation 82. As shown in FIG. 10D, the first thickness 90 is less than the second thickness 92.

Figure 10E:
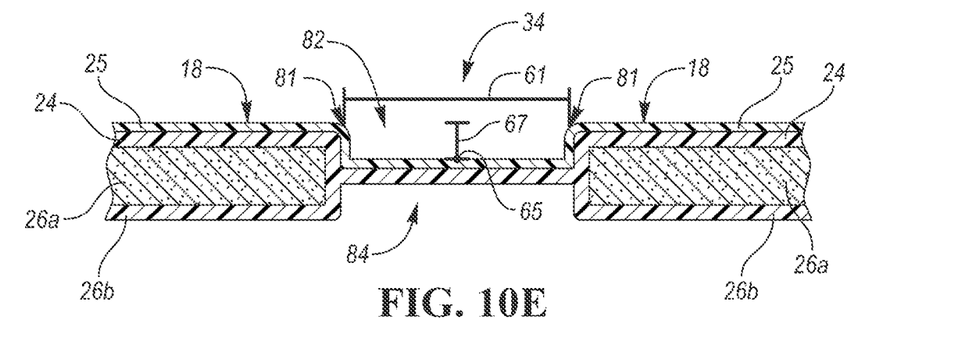
FIG. 10E is an enlarged, schematic, example cross sectional view of an example indentation, wherein the indentations are defined as channels.
Figure 10F:
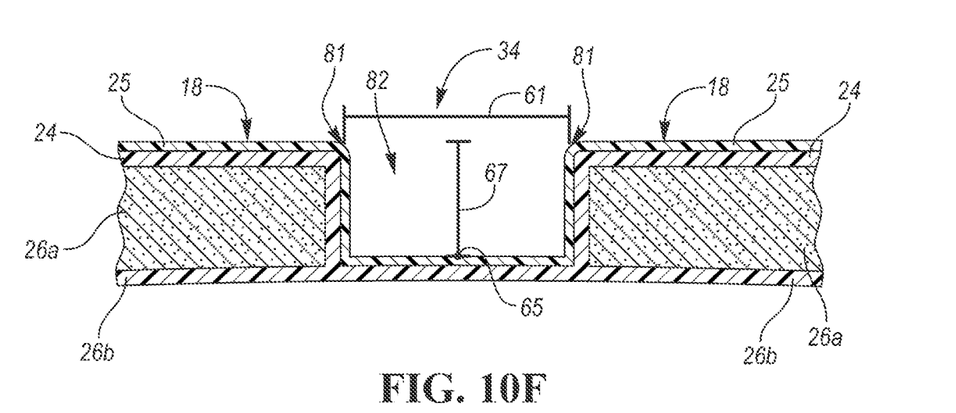
FIG. 10F is an enlarged, schematic, example cross sectional view of an example indentation, wherein the indentations are defined as channels.
Figure 10G:
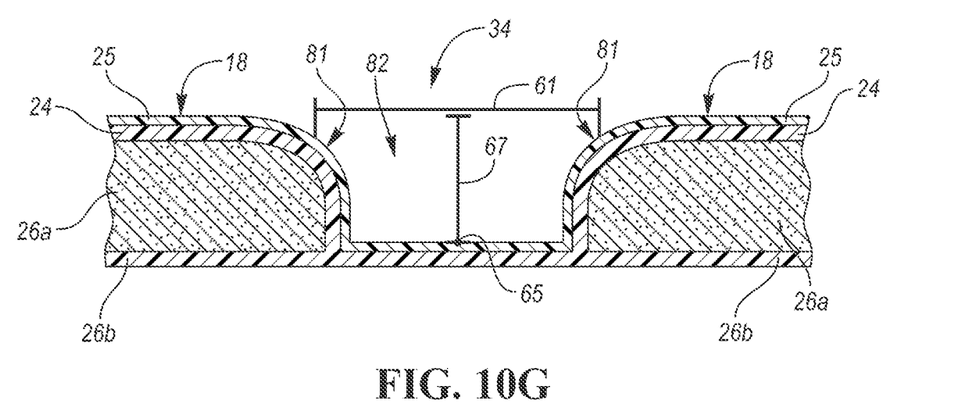
FIG. 10G is an enlarged, schematic, example cross sectional view of an example indentation, wherein the indentations are defined as channels.

Alternatively, the channels 34 may include an exterior indentation 82 and an interior indentation 84 that exhibit substantially squared configurations (FIGS. 10E-10G). For example, in some embodiments, the indentations 82, 84 may have substantially squared cross-sectional configurations. Such substantially squared cross-sectional configurations may have a more distinct appearance than indentations 82, 84 having substantially rounded cross-sectional configurations. In addition, substantially squared indentations 82, 84 may also provide performance benefits such as aerodynamics, ball feel, and water channeling.

As shown in FIGS. 10E-10F, the exterior indentation 82 and interior indentation 84 are two opposing indentations having substantially squared cross-sectional configurations. In FIG. 10E, the indentations 82 and 84 extend to an approximate midpoint of the thickness 88 of the panel cross-section, such that the terminus 65 of the exterior indentation 82 is positioned radially inward from the outer cover layer surface 18 to the approximate midpoint of the thickness 88 of the panel cross-section.

In FIGS. 10F-10G, the exterior indentation 82 may extend through substantially the entirety of the thickness 88 of the panel cross section. As also shown in FIG. 10F-10G, in some embodiments, second intermediate layer 26b may have a substantially planar configuration opposite the exterior indentation 82. Said another way, in some embodiments, the channel 34 may have only an exterior indentation 82 with no interior indentation 84.

As shown in FIG. 10G, in one example embodiment, the channel 34 may include substantially-squared exterior indentation 82 having a rounded shoulder portion 81. In some embodiments, a substantially-squared shoulder portion 81 may have a minimal radius, as shown in FIG. 10F. In another example embodiment, a rounded shoulder portion 81 having a larger radius may be used, as shown in FIG. 10G.

Figure 6E:
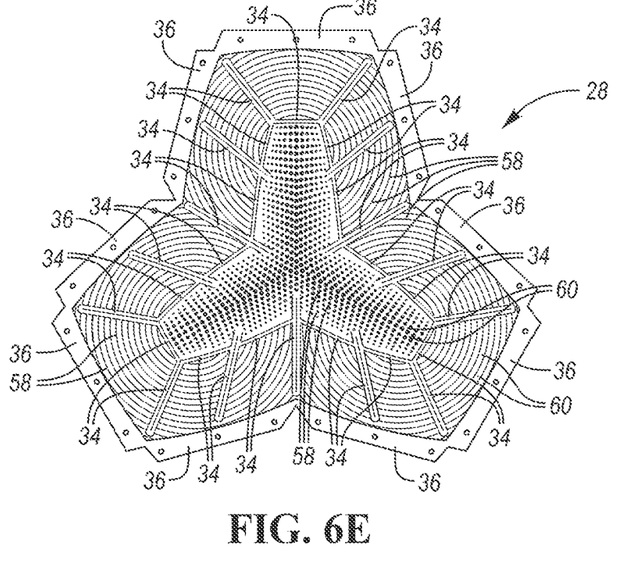
FIG. 6E is an example schematic plan view of an example panel having surface features including a second plurality of indentations and a plurality of protrusions.
Figure 9:
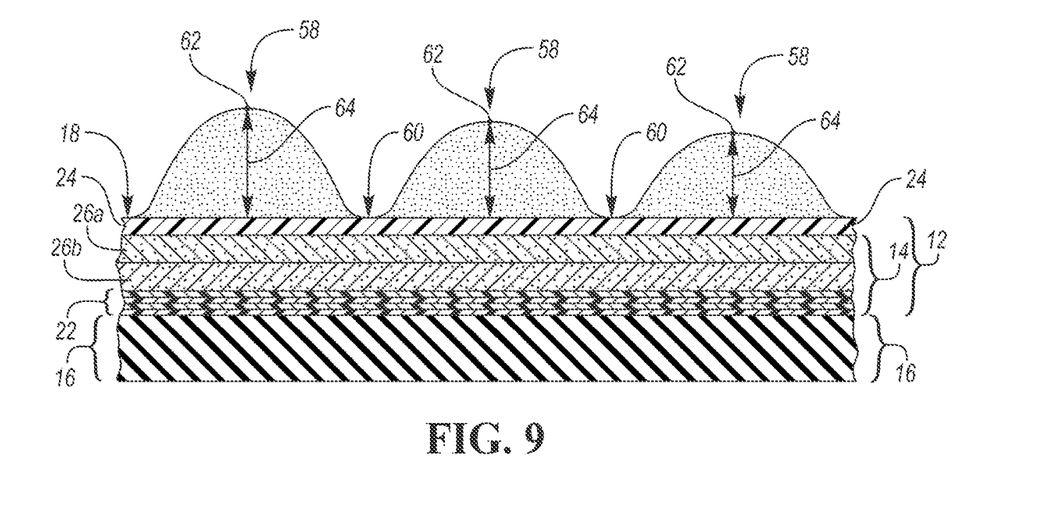
FIG. 9 is an enlarged, schematic cross-sectional view of an example ball having a plurality of protrusions extending from the outer cover layer surface.

Referring to FIGS. 5, 6E, and 9 the plurality of surface features may further include a plurality of protrusions 58. The plurality of protrusions 58 may be disposed upon the outer cover layer surface 18. The protrusions 58 may form decorative or aesthetic arrangements 56 or designs upon the outer cover layer surface 18 of the sports ball 10, display branding of the sports ball 10, via a logo contained therein, and may further be applied in such an orientation as to optimize grip at the point of contact with the user's hand and/or foot, or to improve aerodynamics during flight.

The protrusions 58 may be disposed on a small portion of the outer cover layer surface 18, on a single panel surface, on a select group of panel surfaces, or upon a majority of the outer cover layer surface 18 (FIGS. 5 and 6E).

Each of the protrusions 58 may be formed of a dimensional ink and extend from the outer cover layer surface 18. As shown in FIGS. 5, 6E, and 9, each of the plurality of the protrusions 58 has a terminus 62 that is radially spaced apart from the outer cover layer surface 18 by a height 64 that is greater than about 0.05 millimeters (mm). In such examples, it is beneficial for the height 64 to be at least 0.05 millimeters (mm) and less than 0.15 millimeters (mm) in order to enhance playability of the ball 10. Protrusions 58 having heights 64 in the aforementioned range allow for visibility of the respective panel designs and an overall topographical arrangement 56 of the sports ball 10, while also exhibiting a desired grip or contact between a user and/or player's hand or foot and the exterior surface 13 of the ball 10, all while still allowing the ball 10 to maintain desired aerodynamic and flight characteristics.

Figure 7:
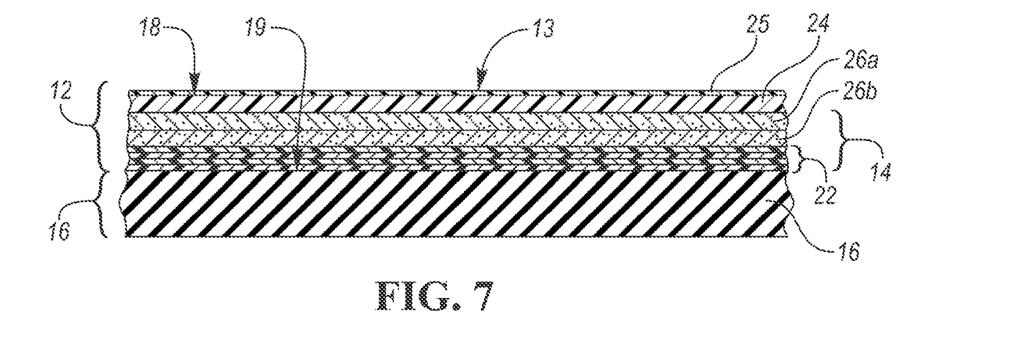
FIG. 7 is an example cross-section view of the panel shown in FIG. 2, taken along line 7-7.

As shown in FIG. 7, the casing 12 may further include an external surface layer 25 disposed upon the outer cover layer surface 18. The external surface layer 25 may be a film that includes a pigment or a graphic thereon. The external surface layer 25 may also be an outer film or clear coat having weather resistant properties. The external surface layer 25 may be a polyurethane film or the like. The external surface layer 25 may be bonded to the outer cover layer surface 18 via a bonding material.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An inflatable sports ball comprising:
   a bladder having an exterior bladder surface;
   an outer cover layer; and
   an intermediate structure disposed between the bladder and the outer cover layer, the intermediate structure including
      a restriction structure comprising a unitary continuous strip of cross-linked polyolefin film wrapped about the bladder, wherein the unitary continuous strip forms a plurality of overlapping layers, and wherein at least one of the plurality of overlapping layers of the unitary continuous strip is disposed in contact with the exterior bladder surface.

2. The inflatable sports ball of claim 1 wherein the restriction structure is formed in a non-planar configuration and shaped to conform with the exterior bladder surface.

3. The inflatable sports ball of claim 1 wherein the cross-linked polyolefin film is a cross-linked polyolefin shrink wrap.

4. The inflatable sports ball of claim 3 wherein the cross-linked polyolefin shrink wrap has a tensile strength of from about 13,000 PSI to about 20,000 PSI in a machine direction, and a tensile strength of from about 13,000 PSI to about 20,000 PSI in a transverse direction.

5. The inflatable sports ball of claim 4 wherein the cross-linked polyolefin shrink wrap has a tear strength from about 15 grams-force to about 50 grams-force in the machine direction, and a tear strength from about 15 grams-force to about 50 grams-force in the transverse direction.

6. The inflatable sports ball of claim 5 wherein the cross-linked polyolefin shrink wrap has a stiffness modulus of from about 35,000 PSI to about 60,000 PSI.

7. The inflatable sports ball of claim 6 wherein the cross-linked polyolefin shrink wrap is a sixty (60) gauge polyolefin shrink wrap having a thickness of at least 15 microns.

8. The inflatable sports ball of claim 3 wherein the intermediate structure further includes a first intermediate layer and a second intermediate layer disposed between the outer cover layer and the restriction structure; and
   wherein the first intermediate layer is disposed between the second intermediate layer and the outer cover layer and the second intermediate layer is disposed between the first intermediate layer and the restriction structure.

9. The inflatable sports ball of claim 8 wherein:
   the first intermediate layer comprises at least one of a textile material or a Thermoplastic Polyurethane (TPU) foam material; and
   the second intermediate layer comprises at least one of a textile material textile material or a Thermoplastic Polyurethane (TPU) foam material.

10. The inflatable sports ball of claim 9 wherein the outer cover layer comprises a plurality of adjoining panels and the plurality of adjoining panels define an outer cover layer surface, the sports ball further comprising:
    a plurality of seams configured to couple the panels, wherein each seam has a seam depth and a seam width;
    a plurality of channels defined by the outer cover layer and spaced apart from each of the seams, each channel having a channel width and a channel depth; and
    a plurality of protrusions extending from the outer cover layer surface to a terminus, wherein the terminus is radially spaced apart from the outer cover layer surface by a height that is greater than about 0.05 millimeters (mm).

11. A method of manufacturing an inflatable sports ball, the inflatable sports ball having an outer cover layer and a bladder defining an exterior bladder surface, the method comprising the steps of:
    placing a unitary continuous strip of cross-linked polyolefin shrink wrap under tension;
    surrounding wrapping the unitary continuous strip of the cross-linked polyolefin shrink wrap about the bladder, having a first circumferential dimension, while the unitary continuous strip of the cross-linked polyolefin shrink wrap is under tension to form a plurality of overlapping layers of the unitary continuous strip of the cross-linked polyolefin shrink wrap, such that the plurality of overlapping layers of the unitary continuous strip of cross-linked polyolefin shrink wrap form a restriction structure in a first dimensional state, wherein at least one of the plurality of overlapping layers of the unitary continuous strip of cross-linked polyolefin shrink wrap is disposed in contact with the exterior bladder surface,
    applying a heat shrinking process to the plurality of overlapping layers of the unitary continuous strip of cross-linked polyolefin shrink wrap to contract the restriction structure from the first dimensional state to a second dimensional state, wherein in the first dimensional state the restriction structure has a first diameter and in the second dimensional state the restriction structure has a second diameter that is smaller than the first diameter, such that the restriction structure in the second dimensional state conforms to a shape of the bladder having the first circumferential dimension; and
    inflating the bladder to a second circumferential dimension, wherein the second circumferential dimension is larger than the first circumferential dimension, such that the exterior bladder surface places an outward bladder force upon the restriction structure and the restriction structure places an inward restriction force upon the bladder exterior surface to restrain an expansion of bladder.

12. The method of claim 11 wherein the restriction structure is formed in a non-planar configuration.

13. The method of claim 12 wherein the step of wrapping the unitary continuous strip of the cross-linked polyolefin shrink wrap about the bladder having the first circumferential dimension to form a plurality of overlapping layers of the unitary continuous strip of cross-linked polyolefin shrink wrap, further includes:

bunching a sheet of the cross-linked polyolefin shrink wrap into the unitary continuous strip of the cross-linked polyolefin shrink wrap.

14. The method of claim 13 wherein the heat shrinking process includes applying a heat gun to the plurality of overlapping layers of cross-linked polyolefin shrink wrap disposed about the bladder.

15. The method of claim 14 wherein:

the cross-linked polyolefin shrink wrap is a sixty (60) gauge polyolefin shrink wrap having a thickness of at least 15 microns;

the cross-linked polyolefin shrink wrap has a tensile strength of from about 13,000 PSI to about 20,000 PSI in the machine direction, and a tensile strength of from about 13,000 PSI to about 20,000 PSI in the transverse direction;

the cross-linked polyolefin shrink wrap has a tear strength from about 15 grams-force to about 50 grams-force in the machine direction, and a tear strength from about 15 grams-force to about 50 grams-force in the transverse direction; and the cross-linked polyolefin shrink wrap has a stiffness modulus of from about 35,000 PSI to about 60,000 PSI.

16. The method of claim 15 further comprising disposing the outer cover layer about the bladder and the restriction structure.

17. The inflatable sports ball of claim 10 wherein the outer cover layer is bonded directly to the second intermediate cover layer at each of the plurality of channels.

18. The inflatable sports ball of claim 1 wherein the plurality of overlapping layers of the unitary continuous strip of polyolefin film comprises at least a first layer and a second layer, wherein the second layer overlaps the first layer.

* * * * *